(12) United States Patent
Carmona (10) Patent No.: US 6,991,202 B2
(45) Date of Patent: Jan. 31, 2006

(54) FLEX GRIP FIXTURE CLAMP

(76) Inventor: Wayne Carmona, 474 S. Wetherly Dr., Beverly Hills, CA (US) 90211

( * ) Notice: Subject to any disclaimer, the term of this patent is extended or adjusted under 35 U.S.C. 154(b) by 0 days.

(21) Appl. No.: 10/630,132

(22) Filed: Jul. 30, 2003

(65) Prior Publication Data

US 2004/0074057 A1    Apr. 22, 2004

Related U.S. Application Data

(60) Provisional application No. 60/419,379, filed on Oct. 17, 2002.

(51) Int. Cl.
*F16B 1/00*      (2006.01)
*G09F 7/18*      (2006.01)

(52) U.S. Cl. .............................. 248/229.14; 248/288.31

(58) Field of Classification Search ........... 248/229.14, 248/229.24, 288.31, 288.51, 229.1, 229.2
See application file for complete search history.

(56) References Cited

U.S. PATENT DOCUMENTS

| | | | | |
|---|---|---|---|---|
| 454,553 A | * | 6/1891 | Whitten ........................ 108/1 |
| 600,642 A | * | 3/1898 | Hartman ................... 248/229.2 |
| 688,230 A | * | 12/1901 | Isgrig et al. ............. 248/316.1 |
| 1,141,152 A | * | 6/1915 | Stahl ..................... 248/229.16 |
| 1,303,345 A | * | 5/1919 | McFeaters .................... 248/72 |
| 1,394,788 A | | 10/1921 | Postada |
| 1,688,148 A | | 10/1928 | Martin |
| 1,735,212 A | * | 11/1929 | Pawsat .................. 248/229.24 |
| 2,267,583 A | | 10/1941 | Carroll |
| 2,896,896 A | * | 7/1959 | Revzin .................. 248/229.15 |
| 2,950,836 A | | 8/1960 | Murdock |
| 3,377,117 A | * | 4/1968 | Biscow ........................ 359/549 |
| 3,452,955 A | | 7/1969 | Hartwig |
| 3,843,083 A | | 10/1974 | Angibaud |
| 3,951,372 A | | 4/1976 | Casler et al. |
| 4,190,224 A | * | 2/1980 | LeBlanc et al. .......... 248/227.3 |
| 4,307,864 A | | 12/1981 | Benoit |
| 4,483,334 A | * | 11/1984 | Murray ........................ 606/59 |
| 4,577,989 A | * | 3/1986 | Ito ............................. 403/140 |
| 4,735,388 A | * | 4/1988 | Marks ........................ 248/103 |
| 4,736,921 A | * | 4/1988 | Zane et al. ............... 248/316.2 |
| 4,903,929 A | * | 2/1990 | Hoffman ................. 248/229.15 |
| 4,941,633 A | * | 7/1990 | Walker et al. ........... 248/228.6 |
| 4,946,122 A | * | 8/1990 | Ramsey et al. .......... 248/229.2 |
| D314,503 S | * | 2/1991 | Gilman ........................ D8/394 |

(Continued)

FOREIGN PATENT DOCUMENTS

GB    2 075 589 A    11/1981

(Continued)

OTHER PUBLICATIONS

Gruppo Manfrotto, Micro Ball Head, viewed at <http://www.manfrotto.com/product/templates/templates.php3?sectionid=8&itemid=1948>, last visited Aug. 19, 2004.

(Continued)

*Primary Examiner*—Anita M. King
(74) *Attorney, Agent, or Firm*—Knobbe, Martens, Olson & Bear LLP (57) ABSTRACT

A grip head includes a progressive support clamp, a biscuit clamp and a ball joint. The progressive support clamp can be actuated from an open position to a support member clamp position. The support member clamp position clamps a support member in a support member channel defined in the progressive support clamp and allows rotation of a ball of the ball joint, to enable positioning of an accessory coupled with the ball. The progressive support clamp can be further actuated to a full clamp position. The full clamp position clamps the support member and fixes the position of the ball and the position of the accessory coupled therewith.

21 Claims, 9 Drawing Sheets

U.S. PATENT DOCUMENTS

| | | | | |
|---|---|---|---|---|
| 5,037,052 A | * | 8/1991 | Crisp et al. | 248/229.23 |
| 5,184,911 A | * | 2/1993 | Wu | 403/385 |
| 5,320,623 A | * | 6/1994 | Pennig | 606/59 |
| 5,344,115 A | | 9/1994 | Mayne et al. | |
| 5,354,026 A | * | 10/1994 | Bulla | 248/227.1 |
| 5,573,329 A | | 11/1996 | van Gennep | |
| 5,697,591 A | | 12/1997 | Cooper | |
| 5,704,727 A | * | 1/1998 | Atkins et al. | 403/135 |
| 5,775,654 A | * | 7/1998 | Price | 248/231.61 |
| 5,806,821 A | | 9/1998 | Phillips et al. | 248/288.51 |
| 5,907,975 A | * | 6/1999 | Giaimo | 74/473.34 |
| 6,286,797 B1 | * | 9/2001 | Thaxton | 248/229.14 |
| 6,386,786 B1 | * | 5/2002 | Perlman et al. | 403/90 |
| D483,650 S | * | 12/2003 | Squillante et al. | D8/349 |

FOREIGN PATENT DOCUMENTS

| | | |
|---|---|---|
| GB | 2 345 656 A | 7/2000 |
| GB | 2 368 520 A | 5/2002 |

OTHER PUBLICATIONS

Gruppo Manfrotto, Grip Action Ball Head, viewed at http://www.manfrotto.com/product/templates/templates.php3?sectionid=8&itemid=2013, last visited Aug. 19, 2004.

Matthews Studio Equipment Catalog, 2003.

Patent Cooperation Treaty, International Search Report for PCT / US 03 / 32271; Mailed Feb. 20, 2004.

* cited by examiner

FLEX GRIP FIXTURE CLAMP

RELATED APPLICATIONS

This application claims the benefit of U.S. Provisional Application Ser. No. 60/419,379, filed Oct. 17, 2002, which is incorporated herein by reference in its entirety.

BACKGROUND OF THE INVENTION

1. Field of the Invention

The application is directed to a clamp that can be used to couple photographic equipment, such as a scrim, to a support member in a manner that allows the scrim to be positioned in a very flexible manner.

2. Description of the Related Art

The nature of visual arts requires considerable control of the amount, type, location, and direction of light that is directed at a subject from a light source. For example, in photography a wide variety of lighting control devices has been developed to set a range of moods for different shots. A scrim, for example, can mute the amount of light incident on the subject, producing a subdued effect. The scrim must be positionable in a wide range of positions in order to achieve a wide range of lighting effects. However, once positioned, the scrim should not require further attention from the photographer because the photographer generally is more concerned with other aspects of the composition of the shot.

One device used to provide a range of positions for a lighting control device and to temporarily secure the lighting device in place is a grip head, also known as a gobo head. A typical grip head includes a tubular sleeve and a pair of discs that sit face-to-face on a centrally located threaded rod. Each of the discs has a groove that partially receives a lighting accessory. The discs are positioned parallel to the tubular sleeve. The discs of the grip head generally are made of cast aluminum or steel. A bolt extends through the discs and is engaged by a wing nut. By advancing the wing nut on the bolt, the discs are drawn toward each other. By retracting the wing nut on the bolt, the discs are permitted to move apart. The lighting accessory includes a rod that is held by pressure placed on the rod when the wing nut is advanced.

One disadvantage of the above-described grip head is that motion is provided in only a plane that is parallel to the discs. Where movement of the scrim in more than one plane is needed, a second grip head is required to be coupled with the first grip head. Thus, rotation of the first grip head provides positioning of the scrim in a first plane while rotation of the second grip head provides positioning of the scrim in a second plane.

SUMMARY OF THE INVENTION

In one embodiment, a flex grip fixture clamp has a progressive support clamp, a biscuit clamp, and a ball joint. The progressive support clamp has a support member channel, a semispherical recess, and a handle. The support member channel is configured to receive a support member. The biscuit clamp has an accessory member channel configured to receive a component of an accessory. The ball joint has a ball that contacts the semispherical recess. The ball joint interconnects the progressive support clamp and the biscuit clamp. The progressive support clamp can be actuated from an open position to a support member clamp position, which is an intermediate clamp position. The support member clamp position precludes movement of the fixture clamp with respect to the support member clamp and allows rotation of the ball. The progressive support clamp can be further actuated to a full clamp position. The position of the ball is fixed in the full clamp position.

Another embodiment is a method for positioning an accessory. A flex grip fixture clamp is provided. The flex grip fixture clamp has a progressive support clamp, an accessory clamp, and a ball joint that interconnects the progressive support clamp and the accessory clamp. The ball joint of the flex grip fixture clamp includes a link member and a ball. The ball is at least partially received by the progressive support clamp. The link member extends to and is coupled with the accessory clamp. An accessory is coupled with the accessory clamp. In accordance with the method, the flex grip fixture clamp is actuated to an open position, wherein the progressive support clamp can be coupled with a support member. The flex grip fixture clamp is actuated to a support member clamp position, wherein the support member is clamped and wherein the ball joint can be articulated. The flex grip fixture clamp is actuated to a full clamp position, wherein the support member is clamped and wherein the ball joint is clamped so that the position of the ball of fixed.

In accordance with another embodiment, a grip head includes a progressive support clamp, a biscuit clamp and a ball joint. The progressive support clamp has an elongate mounting arm, a ball joint portion, and a clamp-actuating handle. The elongate mounting arm defines a first support member channel that extends along a central longitudinal axis of the elongate mounting arm. The ball joint portion defines a semispherical recess and also defines a bearing recess positioned opposite the semispherical recess. The biscuit clamp has a plurality of support member channels configured to receive support rods of different sizes from a photographic accessory. Within the ball joint, a ball contacts the semispherical recess, a bearing is received by the bearing recess, and a link member extends between the ball and the biscuit clamp. The progressive support clamp can be actuated from an open position to an intermediate support member clamp position at which the grip head clamps a support member in the support member channel but continues to allow rotation of the ball. The progressive support clamp can be further actuated to a full clamp position. In the full clamp position, the grip head clamps the support member in the support member channel and fixes the position of the ball.

In accordance with another embodiment, a flex grip fixture clamp has a progressive clamp, a biscuit clamp, and a ball joint. The progressive claim has a support member channel, a semispherical recess, and a handle. The support member channel receives a support member. The handle has at least an open position, a support member clamp position, and a full clamp position. The biscuit clamp has an accessory member channel that receives a component of an accessory. The ball joint includes a ball that is selectably engageable with the semispherical recess. The ball joint interconnects the progressive clamp and the biscuit clamp. The progressive clamp responds to the handle being in the open position by enabling movement of the progressive clamp with respect to the support member and by enabling movement of the ball with respect to the progressive clamp. The progressive clamp responds to the handle being in the support member clamp position by inhibiting movement of the progressive clamp with respect to the support member and by enabling movement of the ball with respect to the progressive clamp. The progressive clamp responds to the handle being in the full clamp position by inhibiting movement of the progressive clamp with respect to the support member and by inhibiting movement of the ball with respect to the progressive clamp.

BRIEF DESCRIPTION OF THE DRAWINGS

The foregoing and other features, aspects and advantages of the present invention are described below with reference to the accompanying drawings that show a presently preferred arrangement that is intended to illustrate but not to limit the present invention, in which:

FIG. 5B is a cross-sectional view, taken along line 5B—5B, of the bearing of

FIG. 5A, with the position of the ball shown in phantom;

DETAILED DESCRIPTION OF THE PREFERRED EMBODIMENT

Figure 1A:
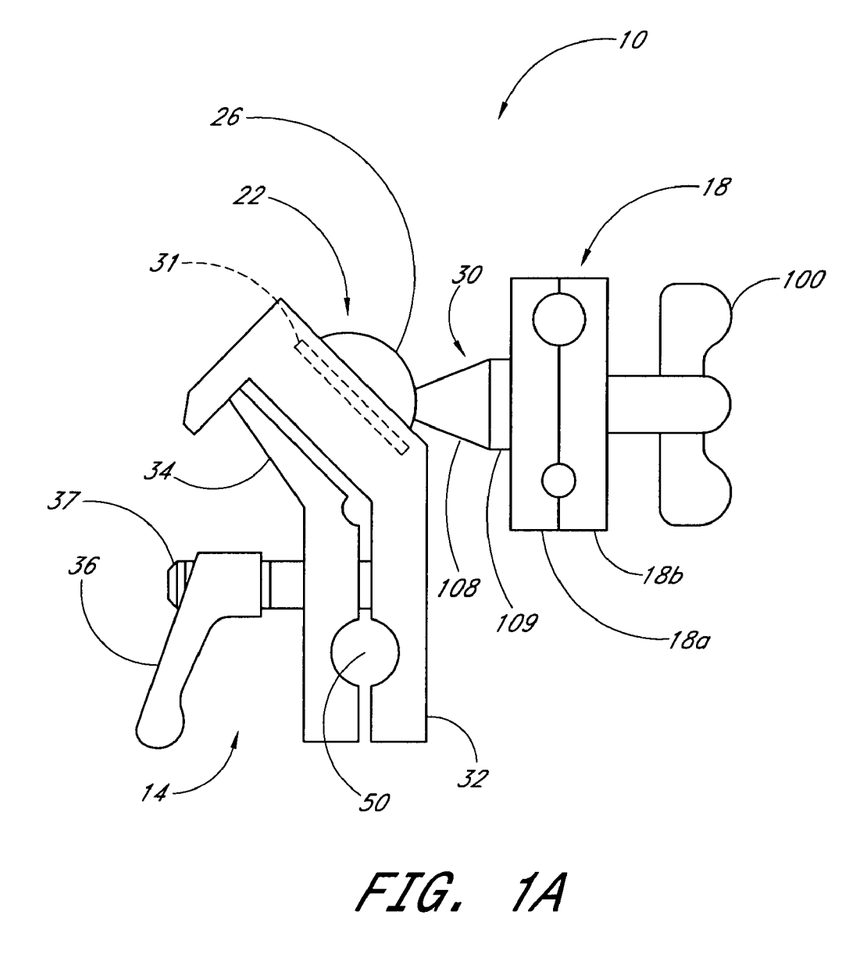
FIG. 1A is a schematic side elevation view of one embodiment of a flex grip fixture clamp.
Figure 1B:
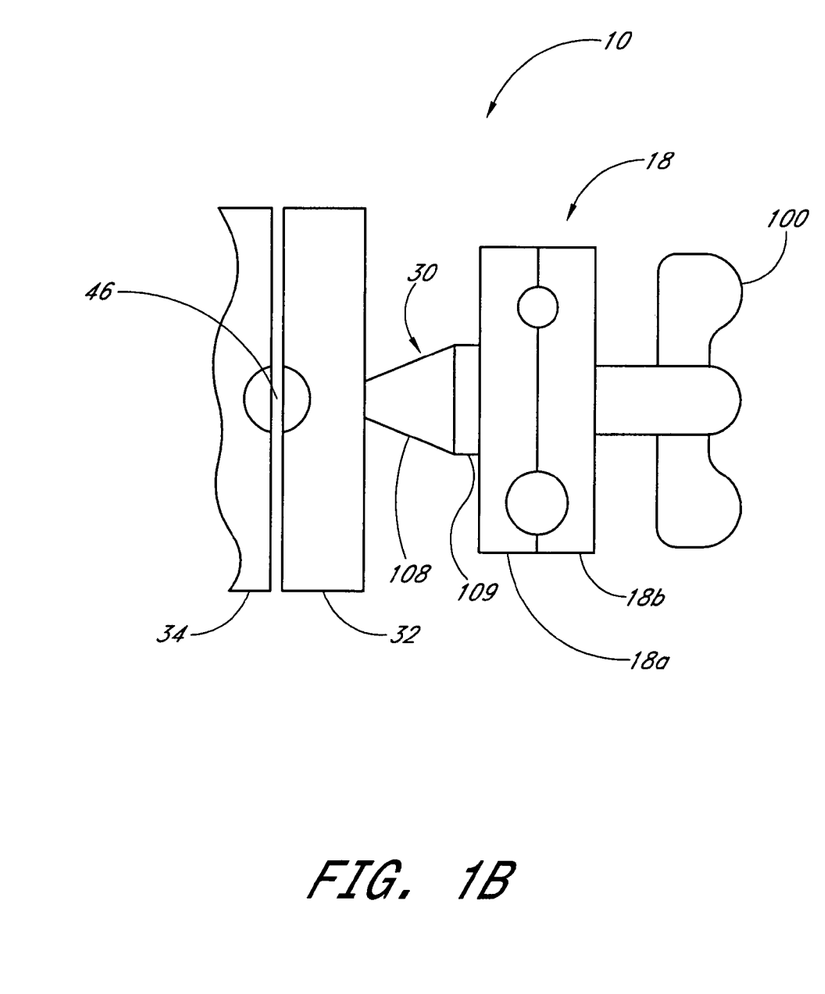
FIG. 1B is a schematic partial bottom view of the flex grip fixture clamp of FIG. 1A.

FIG. 1 illustrates one embodiment of a flex grip fixture clamp 10 that includes a progressive support clamp 14, a biscuit clamp 18, and a ball joint 22. In one embodiment, the ball joint 22 includes a ball 26 and a link member 30. The ball 26 can be made of any suitable material, e.g., aluminum or steel. Also, the link member 30 can be made of any suitable material, e.g., aluminum or steel. The ball joint 22 also preferably includes a bearing 31 (shown more clearly in FIGS. 5A–5B).

The ball 26 preferably is partially housed in the progressive support clamp 14 where it coupled with at least one semispherical surface of the clamp 14. The link member 30 is preferably coupled with the biscuit clamp 18 so that movement of the ball 26 is transmitted through the link member 30 to the biscuit clamp 18. In one embodiment, the biscuit clamp 18 is configured to hold a photographic accessory, such as, for example, a scrim or other accessory to provide a desired lighting effect. As discussed more fully below, the ball joint 22 omnidirectionally positions the biscuit clamp 18 with respect to the progressive support clamp 14. Thus, the photographic accessory coupled with the biscuit clamp 18 can be positioned, as desired, in a multitude of positions and orientations using only a single clamping device.

Although the biscuit clamp 18 is discussed herein as being configured to hold a photographic accessory, the flex grip fixture clamp 10 can be configured to precisely position a wide range objects and to hold such objects temporarily so that the user's hands are free for other tasks. Also, the biscuit clamp 18 can be replaced by any suitable accessory clamp or other holding device. In some embodiments, the link member 30 is configured to couple directly with a photographic accessory or with another item desired to be clamped.

The progressive support clamp 14 includes a front housing 32, a back plate 34, and a clamping handle 36 in one embodiment. The front housing 32, the back plate 34, and the clamping handle 36 can be made of any suitable material, e.g., aluminum. FIG. 1A illustrates that one end of the back plate 34 is received within a slot (shown in FIG. 2A and discussed below) formed in a corresponding end of the front housing 32. As discussed more fully below, the slot in the front housing 32 provides for fine adjustment of the clamping of at least the ball joint 22 in some embodiments.

The handle 36 preferably is an elongate member that can be grasped and rotated by hand. The handle 36 includes a release mechanism 37 in one embodiment. The release mechanism 37 temporarily disengages the handle 36 from the support clamp 14 so that the handle 36 can be repositioned without adjusting the support clamp 14. Thus, the handle 36 can be used to tighten the progressive support clamp 14 by rotating through an arc (i.e., through less than 360 degrees). After the support clamp 14 is tightened, the handle 36 can be temporarily disengaged to move the handle 36 to a desired resting position (e.g., so that the handle does not extend outside the boundary of the back plate 34).

Figure 2A:
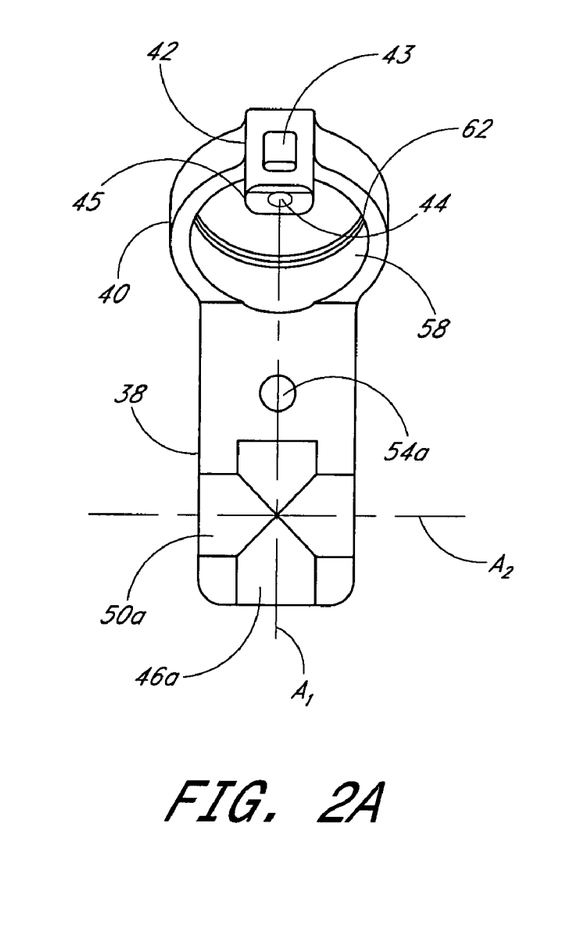
FIG. 2A is a rear elevation view of one embodiment of a front housing of the flex grip fixture clamp of FIG. 1.
Figure 2B:
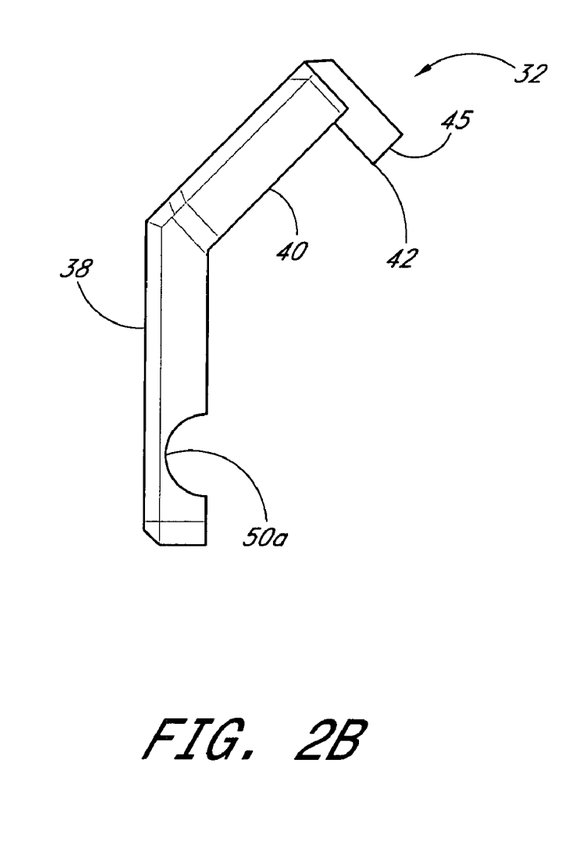
FIG. 2B is a side elevation view of the front housing of FIG. 2A.

As shown in FIG. 2A, the front housing 32 includes an elongate mounting arm 38, a ball joint portion 40, and an overhang 42. In one embodiment, the elongate mounting arm 38 is about 2.5 inches (6.35 cm) long, about 1.25 inches (3.2 cm) wide, and about 0.5 inches (1.3 cm) thick. As shown in FIG. 2B, the elongate arm 38, the ball joint portion 40, and the overhang 42 form an inverted J in one embodiment. The overhang 42 preferably includes a slot 43 and a threaded through-hole 44. The slot 43 is preferably a generally rectangular slot formed in the overhang 42 between the ball joint portion 40 and an end 45 of the overhang 42 that is located farthest from the ball joint portion 40. The through-hole 44 preferably extends from the end 45 and is threaded to receive an advanceable member (not shown), which is a hex screw in one embodiment. As discussed more fully below, the advanceable member is configured to effectively alter the length of the slot 43. As shown in FIG. 1, the back plate 34 is nested within the front housing 32, with one end of the back plate 34 being received in the slot 43 of the front housing 32.

Figure 2C:
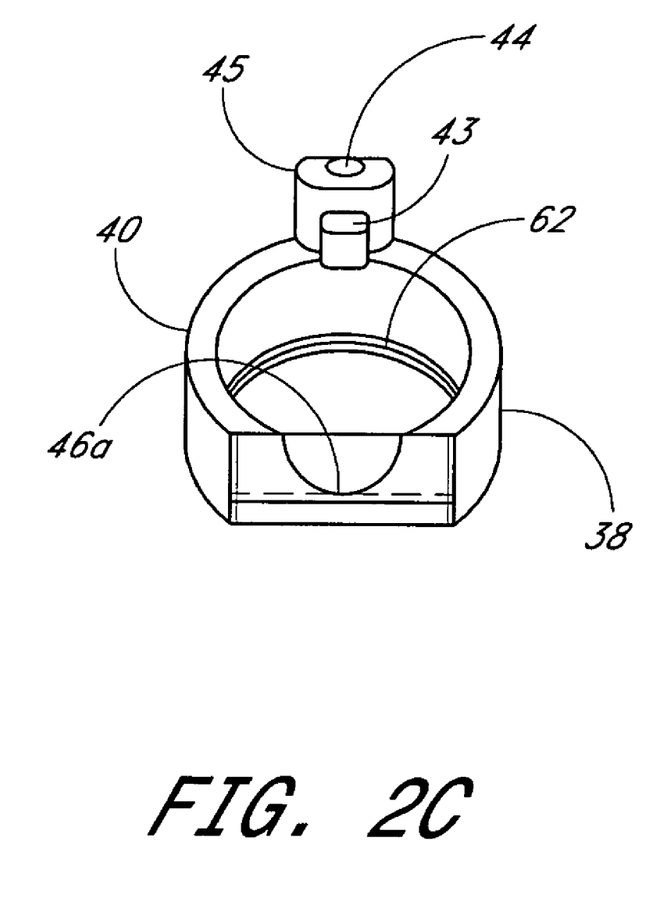
FIG. 2C is a rotated bottom view of the front housing of FIG. 2A.

As further shown in FIG. 2A, the elongate mounting arm 38 defines a first recess 46a, a second recess 50a, and a front housing connecting bore 54a in one embodiment. The first recess 46a preferably is aligned with a central longitudinal axis A1 of the front housing 32. The second recess 50a preferably extends along a longitudinal axis A2 that is perpendicular to the axis A1. The longitudinal axis A2 along which the second recess 50a extends is located about 0.7 inches (1.8 cm) from an end of the front housing 32 that is opposite the ball joint portion 40. Preferably, the longitudinal axis A2 is located about 0.688 inches (1.75 cm) from the end of the front housing 32 that is opposite the ball joint portion 40. Both the recess 46a and the recess 50a are semi-cylindrical in the illustrated embodiment (see FIGS. 2B and 2C). In one embodiment, the length of each of the recesses 46a, 50a is about 1.25 inches (3.2 cm) and the width (e.g., the diameter of the semi-cylindrical cross-section) of each of the recesses 46a, 50a is about 0.625 inches (1.6 cm). The front housing connecting bore 54a is preferably about 0.25 inches (0.64 cm) deep and 0.257 inches (0.653 cm) in diameter. The bore 54a can have any suitable thread design. In one embodiment, the bore 54a has approximately 18 threads per inch. Preferably, the front housing connecting bore 54a is located about 1.625 inches (4.1 cm) from the end of the elongate mounting arm 38 that is opposite the ball joint portion 40.

Figure 5A:
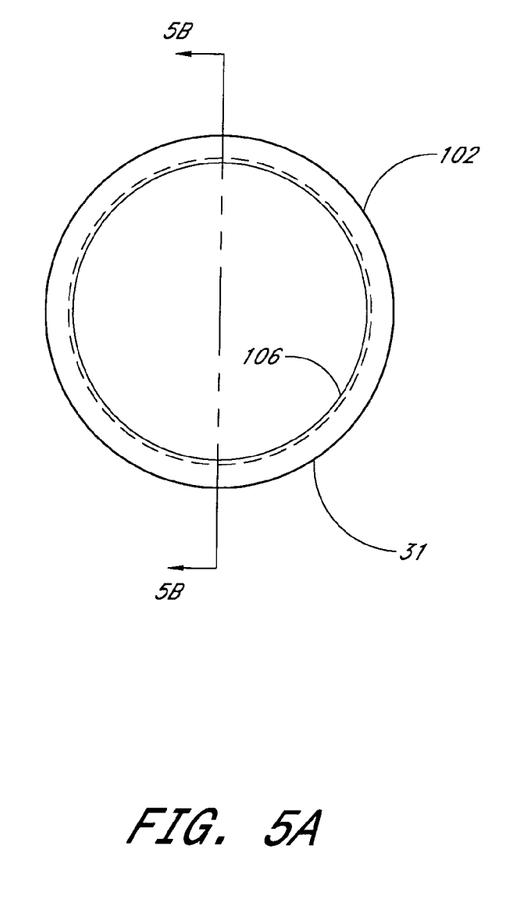
FIG. 5A is a top elevation view of one embodiment of a bearing of the flex grip fixture clamp of FIG. 1.
Figure 5B:
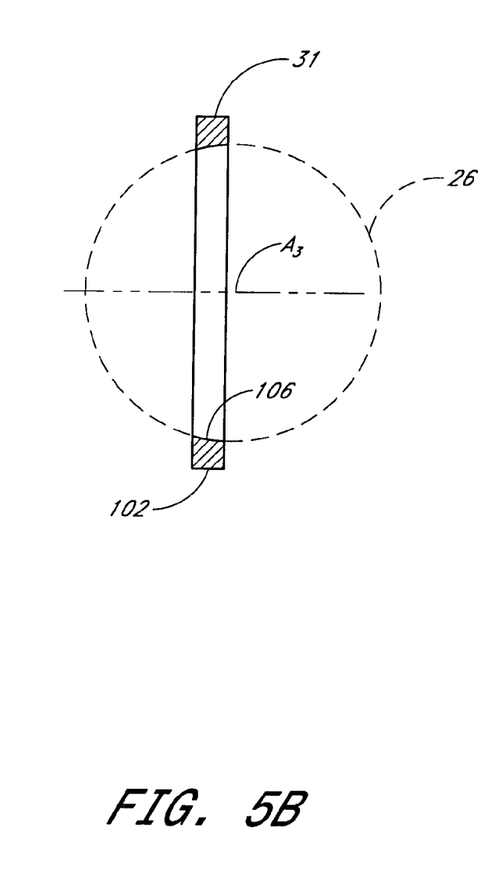

The ball joint portion 40 of the front housing 32 preferably defines a cylindrical recess 58 that is configured to receive the bearing 31 (FIGS. 5A and 5B). Thus, the cylindrical recess 58 is a bearing recess, as discussed more fully below. The ball joint portion 40 also includes a retaining lip 62 formed at the bottom of the cylindrical recess 58 on a side of the front housing 32 that is opposite the overhang 42. Preferably the ball joint portion 40 extends from an end of the elongate mounting arm 38 that is opposite the end where the recesses 46a, 50a are defined. The retaining lip 62 preferably is a constriction at the bottom of the recess 58 that is integrally formed with the ball joint portion 40. The inner diameter of the retaining lip 62 is about 1.3 inches (3.3 cm) in one embodiment, and the outer diameter of the constriction of the retaining lip 62 is about 1.4 inches (3.6 cm). The retaining lip 62 partially confines the bearing 31 with a recess 58. The recess 58, together with the bearing 31, partially supports the ball 26 in a manner that permits rotational positioning thereof. In particular, the ball 26 is confined between the bearing 31 and the back place 34. The retaining lip 62 applies pressure against a hemisphere of the ball via the bearing 31. The constriction of the ball between the retaining lip 62 (via the bearing 31) and the back plate 34 applies pressure on opposite hemispheres of the ball 26. Depending on the level of pressure, the ball 26 is allowed to rotate or the ball 26 is fixed.

The ball joint portion 40 of the front housing 32 preferably is ring-shaped and has an outer diameter of approximately 1.75 inches (4.4 cm) and a thickness of approximately 0.5 inch (1.3 cm). Preferably an angle of about 135 degrees is defined between the ball joint portion 40 and the elongate mounting arm 38. The overhang 42 is an elongate member that extends from an end of the ball joint portion 40. In a preferred embodiment, the overhang 42 is located diametrically across from the elongate mounting arm 38. The overhang 42 preferably extends a distance that is about equal to the thickness of the ball joint portion 40 away from one side of the ball joint portion 40. Preferably, the overhang 42 is about 0.6 inches (1.5 cm) wide, more preferably about 0.563 inches (1.4 cm) wide. Preferably, the overhang 42 is about 0.3 inches (0.76 cm) thick, more preferably about 0.308 inches (0.8 cm) thick. The overhang 42 and the ball joint portion 40 of the front housing 32 are formed at about a 90-degree angle with respect to each other so that the overhang 42, the ball joint portion 40, and the elongate mounting arm 38 of the front housing 32 form an inverted J, as discussed above. As discussed above, the slot 43 is formed in the overhang 42, as is the through-hole 44, which extends from the end 45 to the slot 43.

Figure 3A:
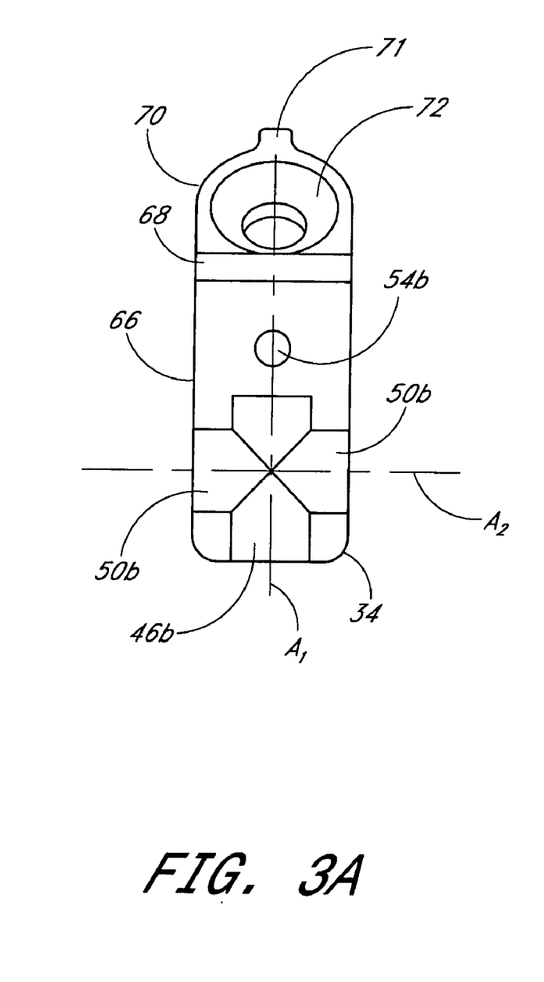
FIG. 3A is a front elevation view of one embodiment of a back plate of the flex grip fixture clamp of FIG. 1.
Figure 3B:
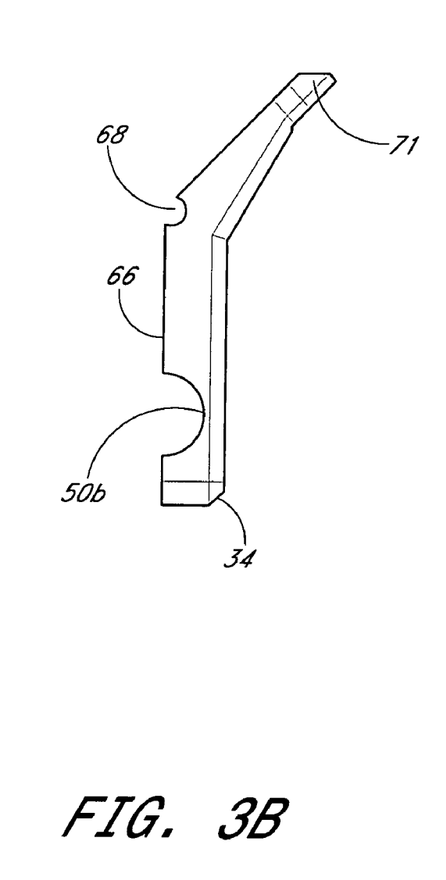
FIG. 3B is a side elevation view of the back plate of FIG. 3A.
Figure 3C:
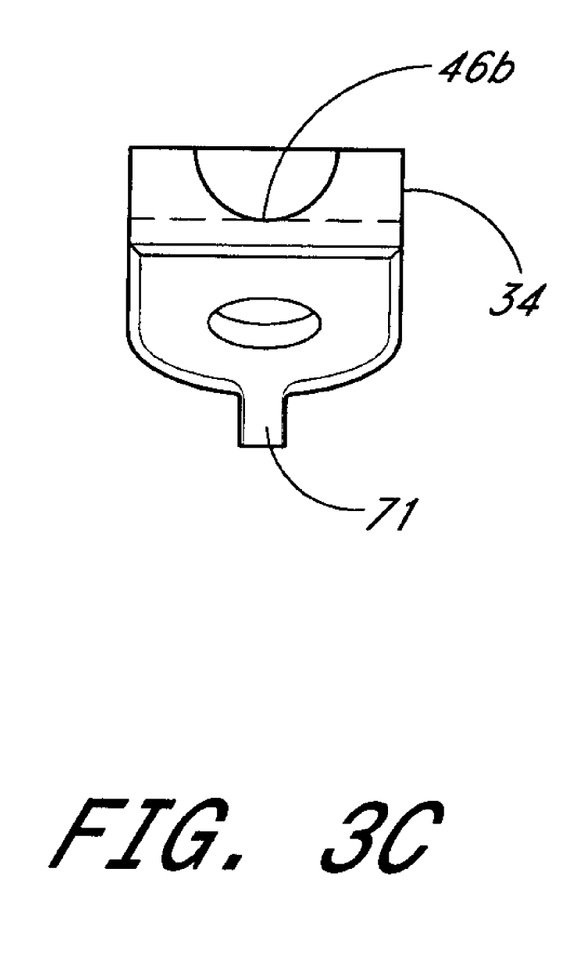
FIG. 3C is a rotated bottom view of the back plate of FIG. 3A.

The back plate 34 is shown in greater detail in FIGS. 3A and 3B. In particular, the back plate 34 includes an elongate mounting arm 66, a transverse recess 68, and a ball joint portion 70. In one embodiment, the elongate mounting arm 66 is about 2.25 inches (5.7 cm) long, about 1.25 inches (3.2 cm) wide, and about 0.5 inches (1.27 cm) thick. The transverse recess 68 is formed at a location generally where the elongate mounting arm 66 and the ball joint portion 70 are joined. Preferably the transverse recess 68 is a semi-cylindrical recess that has a width (e.g., the diameter of the semi-cylindrical cross-section) of 0.25 inches (0.64 cm) and that extends all the way across the back plate 34. In one embodiment, the transverse recess 68 is located about 2.25 inches (5.72 cm) from the end of the elongate mounting arm 66 that is opposite the ball joint portion 70.

In one embodiment, the ball joint portion 70 has a semispherical recess 72 formed on one side thereof. The semispherical recess 72 forms one portion of a semispherical chamber into which the ball 26 is at least partially received, as discussed more fully below. In one embodiment, the ball joint portion 70 is about 1.625 inches (4.128 cm) long, about 1.25 inches (3.175 cm) wide, and has a thickness that decreases from an end that is connected to the elongate mounting arm 66 to the opposite end. The end opposite the end that is connected to the elongate mounting arm 66 is about 0.25 inches (0.635 cm) thick. An angle of about 45 degrees is formed between the elongate mounting arm 66 and the ball joint portion 70. FIG. 3B illustrates that the ball joint portion 70 preferably becomes somewhat thinner from proximate the elongate mounting arm 66 to an end opposite the elongate mounting arm 66.

The ball joint portion 70 preferably also includes a tab 71 that extends from the end of the ball joint portion 70 that is opposite the elongate mounting arm 66. The tab 71 is configured to extend from the ball joint portion 70 of the back plate 34 into the slot 43 in the front housing 32 when the front housing 32 and the back plate 34 are nested together. This arrangement permits fine adjusting of the flex grip fixture clamp 10, in particular the ball joint 22, when the flex grip fixture clamp 10 is used. Fine adjusting of the flex grip fixture clamp 10 is discussed more fully below.

The elongate mounting arm 66 has a first recess 46b, a second recess 50b, and a back plate connecting bore 54b formed therein in one embodiment. When the back plate 34 and the front housing 32 are nested together, the first recess 46b preferably is aligned with the first recess 46a of the front housing 32. The second recess 50b preferably extends along a longitudinal axis A2 that is perpendicular to the axis A1 and is aligned with the corresponding longitudinal axis A2 of FIG. 2A. The center of the second recess 50b is located about 0.7 inches (1.778 cm) from an end opposite the ball joint portion 70. Preferably, the center of the second recess 50b is located at 0.688 inches (1.748 cm) from the end opposite the ball joint portion 70. Both the recess 46b and the recess 50b are semicylindrical in the illustrated embodiment. In one embodiment, the length of each of the recesses 46b, 50b is about 1.25 inches (3.175 cm) and the width (e.g., the diameter of the semi-cylindrical cross-section) of each of the recesses 46b, 50b is about 0.625 inches (1.588 cm). The back plate connecting bore 54b preferably is an unthreaded through-hole having a diameter of about 0.315 inch (0.800 cm).

The front housing 32 and the back plate 34 are separable components that are coupled for use in one embodiment. In particular, to couple the front housing 32 and the back plate 34, the tab 71 of the back plate 34 is inserted into the slot 43 of the front housing 32, and the connecting bores 54a and 54b are aligned. A bolt (not shown) is inserted through the bore 54b and is coupled with the threads in the bore 54a. When the front housing 32 and the back plate 34 are coupled in this manner, the first recess 46a and the first recess 46b are aligned, and a first support member channel 46 configured to receive a support member is formed therebetween (see FIG. 1B). In the illustrated embodiment, a second support member channel 50 configured to receive a support member is also formed between the second recess 50a, and the second recess 50b when the coupling of the front housing 32 and the back plate 34 causes the recesses 50a, 50b to be aligned (see FIG. 1A). Although the support member channels 46, 50 are shown as having the same size, they can be made to have different sizes in different embodiments.

Figure 4A:
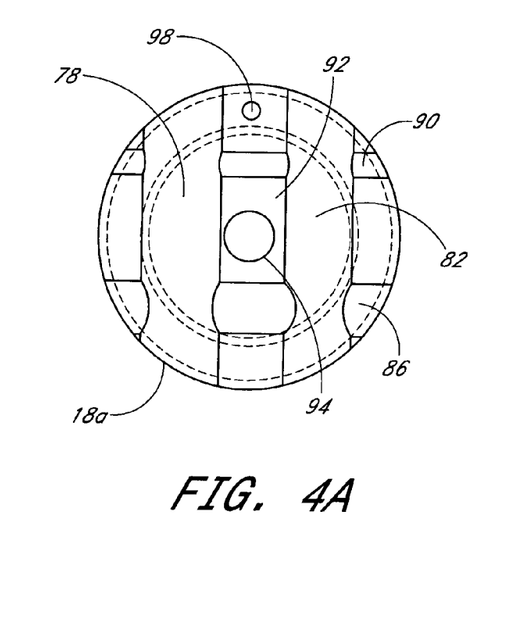
FIG. 4A is a front elevation view of one embodiment of a biscuit clamp of the flex grip fixture clamp of FIG. 1.
Figure 4B:
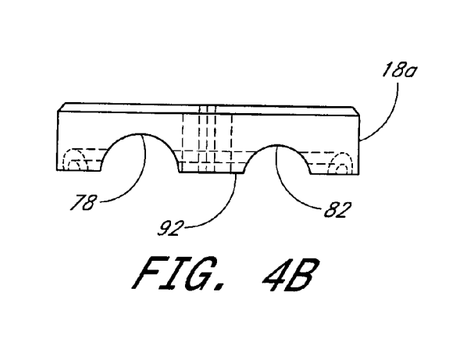
FIG. 4B is a top plan view of the biscuit clamp of FIG. 4A.
Figure 4C:
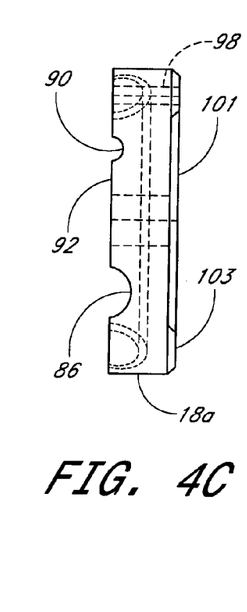
FIG. 4C is a side view of the biscuit clamp of FIG. 4A.

As discussed above, the progressive support clamp preferably is coupled with another clamp that holds an object, such as a photographic lighting accessory. As discussed above, one embodiment provides the biscuit clamp 18. The biscuit clamp 18 preferably has a first half 18a and a second half 18b, wherein the first and second halves 18a, 18b are mirror images of each other. The first and second halves 18a, 18b can be made of any suitable material, e.g., aluminum. Because the first and second halves 18a, 18b are mirror images of each other, only one half 18a is illustrated in FIGS. 4A–4C and is described herein below. However, it will be understood that a mirror image half 18b is to be constructed and mated with the illustrated half 18a as shown in FIG. 1A.

FIGS. 4A–4C illustrate one embodiment of the front half 18a of the biscuit clamp 18. The front half 18a is generally round and has a diameter of about 2.25 inches (5.715 cm). Preferably, the diameter of the front half 18a is about 2.265 inches (5.753 cm). In one embodiment, the half 18a has a first accessory member recess 78, a second accessory member recess 82, a third accessory member recess 86, and a fourth member accessory recess 90 formed on an inner mating surface 92. The first half 18a also has a centrally located primary through-bore 94, and has a secondary through-bore 98 that is located proximate the outer perimeter of the front half 18a. The primary through-bore 94 has a diameter of about 0.4 inches (1.016 cm). More preferably, the diameter of the through-bore 54 is about 0.38 inches (0.965 cm). The secondary through-bore 98 preferably has a diameter of 0.125 inches (0.318 cm).

Each of the accessory member recesses 78, 82, 86, and 90 is configured to receive a portion of a component of an accessory, e.g., a lighting accessory support rod. Accordingly, the accessory member recesses 78, 82, 86, and 90 preferably are semi-circular in transverse cross-section. In one embodiment, the first accessory member recess 78 and the second accessory member recess 82 are parallel to each other and are parallel to a line extending from the center of the primary through-bore 94 to the center of the secondary through-bore 98. In one embodiment, the third accessory member recess 86 and the fourth accessory member recess 90 are parallel to each other and are oriented generally perpendicularly to the first and the second accessory member recesses 78, 82. The third and fourth accessory member recesses 86, 90 preferably are disposed on opposite sides of the primary through-bore 94.

Preferably each of the accessory member recesses 78, 82, 86, and 90 has a different transverse dimension. For example, in one embodiment, the first accessory member recess 78 has a transverse width of about 0.625 inches (1.588 cm), the second accessory member recess 82 has a transverse width of about 0.5 inches (1.27 cm), the third accessory member recess 86 has a transverse width of about 0.375 inches (0.953 cm), and the fourth accessory member recess 90 has a transverse width of about 0.188 inches (0.478 cm). Thus, when the first half 18a and the second half 18b are coupled, as shown in FIG. 1A, each of the pairs of juxtaposed recesses 78, 82, 86, 90 in the two halves 18a, 18b from an accessory member channel that is configured to receive a component of an accessory, e.g., an accessory support rod. The biscuit clamp 18 thus advantageously can receive and clamp a variety of support members, thereby supporting accessories of various sizes.

The primary through-bore 94 in the first half 18a (and in the second half 18b) enable the biscuit clamp 18 to be coupled to the link member 30. For example, as discussed below in connection with FIG. 6, a corresponding through-bore is advantageously provided on the link member 30 to receive a bolt (not shown) coupled with a handle 100 when the bolt is inserted into the through-bore 94. See FIG. 1. The portion of the link member 30 that receives the bolt coupled with the handle 100 preferably is made of steel. The handle 100 can be made of any suitable material, e.g., aluminum. In one embodiment, the first half 18a also has a recess 101 on an outer surface 103 opposite the mating surface 92 wherein the recesses 78, 82, 86, and 90 are formed. The recess 101 provides a flat surface against which a portion of the handle 100 can abut or against which a portion of the link member 30 can abut, as discussed below. The depth of the recess 101 preferably is about 0.063 inches (0.160 cm). The secondary through-bore 98 enables alignment of the first half 18a and the second half 18b. For example, a pin (not shown) can be inserted into the secondary through-bores 98 of the two halves 18a, 18b to assure alignment of the corresponding recesses. In one embodiment, the pin can be an integral portion of one half (e.g., the second half 18b), received in the secondary through-bore 98 of the other half 18a when the halves 18a, 18b are coupled.

As discussed above, the ball joint 22 of the flex grip fixture clamp 10 includes a bearing 31. FIG. 5A is a top elevation view of one embodiment of the bearing 31, which has an outer periphery 102 and an inner curved wall 106. The outer periphery 102 of the bearing 31 is defined by a cylindrical wall that is parallel to a central axis A3 of the bearing 31. Thus, the bearing 31 preferably is shaped as a ring. The inner curved wall 106 of the bearing 31 is curved along a radius that matches the radius of the ball 26. In the illustrated embodiment, the curved wall 106 is curved along a radius of about 0.625 inches (1.588 cm) that is centered at the central axis A3. See FIG. 5B. Thus, as shown in FIG. 5B, the curved surface of the wall 106 conforms to the ball 26.

The bearing 31 can be made of any suitable material, e.g., aluminum or a plastic material, such as Delrin®. Although the bearing 31 is shown as a distinct component that is received within the recess 58 of the front housing 32, the bearing could be formed as an integral surface of the front housing 32. Such a surface could be incorporated into the retaining lip 62, for example. The bearing 31 shown in FIGS. 5A and 5B is advantageously replaceable if damaged or worn with use.

As discussed above, in the illustrated embodiment, when the flex grip fixture clamp 10 is assembled, the bearing 31 is received within the recess 58 of the front housing 32, and the ball 26 is placed in contact with the inner curved wall 106 of the bearing 31. The back plate 34 is placed over the ball 26 by inserting the tab 71 of the back plate 34 into the slot 43 of the front housing 32 and by aligning the front housing connecting bore 54a and the back plate connecting bore 54b. A bolt is inserted through the connecting bores 54a, 54b to interconnect the back plate 34 and the front housing 38. When the bolt is advanced to engage the threads of the front housing connecting bore 54a, the bearing 31 and the back plate 34 apply forces to opposite hemispheres of the ball 26 and, depending on the level of pressure, allow rotation of the ball 26 or hold the ball 26 firmly in place.

Figure 6:
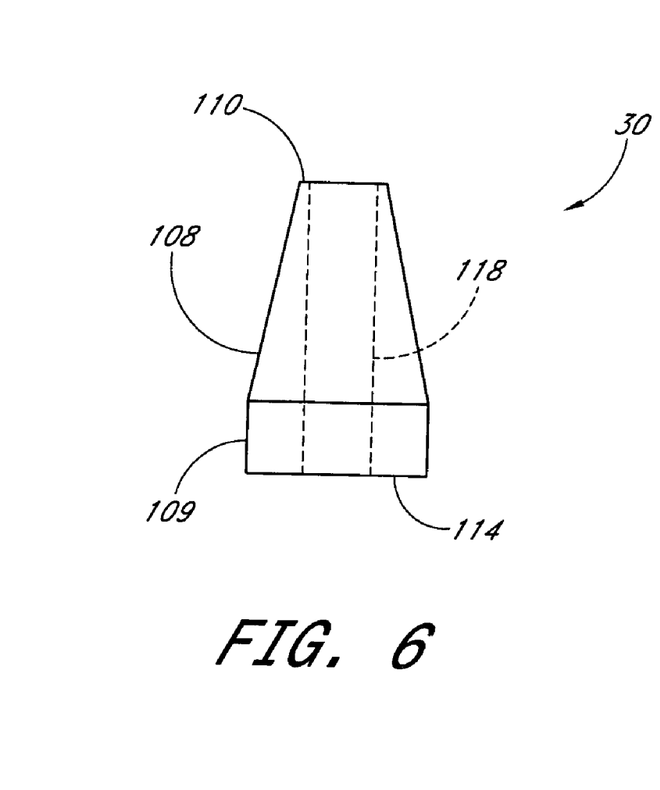
FIG. 6 is an elevation view of one embodiment of a link member of the flex grip fixture clamp of FIG. 1, with a through-bore shown in phantom.

FIG. 6 illustrates one embodiment of the link member 30 in greater detail. The link member 30 is about 1.5 inches (3.81 cm) long and has a generally cone-shaped portion 108 and a generally cylindrical portion 109. The link member 30 includes a first end 110, a second end 114, and a through-bore 118 that extends from the first end 110 to the second end 114. The first end 110 is configured to couple with the ball 26, and the second end 114 is configured to couple with the biscuit clamp 18. Preferably the first end 110 is smaller than the second end 114. In one embodiment, the first end 110 has an outer diameter of about 0.25 inches (0.635 cm) and the second end 114 has an outer diameter of about 0.5 inches (1.27 cm).

By providing the link member 30 with a smaller first end 110, the range of motion of the ball 26 within the progressive support clamp 14 is greater than it would be if both ends of the link member 30 were the same size as the second end 114 because the smaller first end 110 provides more clearance from the front housing 32 as the angle between the link member 30 and the front housing 32 decreases. The increased clearance enables the flex grip fixture clamp 10 to achieve a wider range of positions. The wider range of positions increases the range of visual effects possible with the lighting accessory mounted therein when the flex grip fixture clamp 10 is used to provide a desired lighting effect for photography. In addition, by providing the wider second end 114, the stability of the biscuit clamp 18 is increased because a greater contact area is provided between the link member 30 and the biscuit clamp 18 than if the second end 114 of the link member 30 had the same size as the first end 110.

In one embodiment, the cylindrical portion of the link member 30 is about 0.375 inches (0.953 cm) long and is provided at the second end 114 of the link member 30. In one embodiment, the through-bore 118 has threads located on the inside thereof. Any suitable thread design can be employed. In one embodiment, a thread density of sixteen threads per inch is provided in a hole having a diameter of 0.375 inches (0.953 cm).

Figure 7:
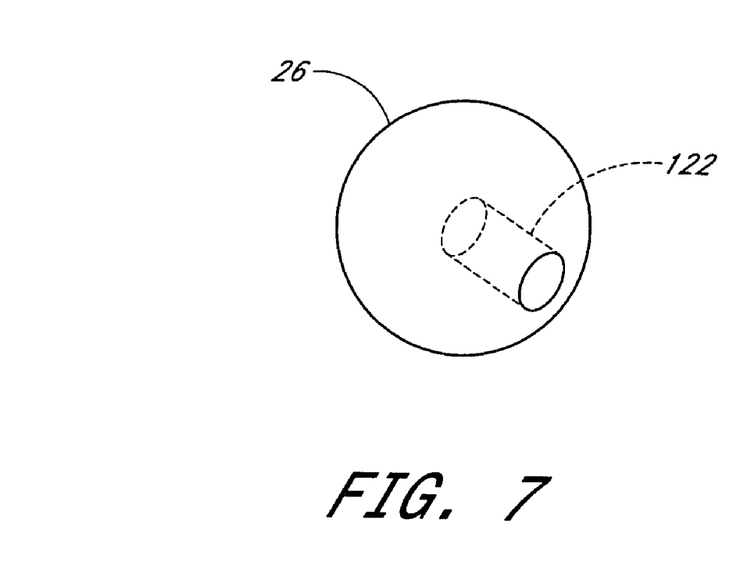
FIG. 7 is a perspective view of one embodiment of a ball of the flex grip fixture clamp of FIG. 1, showing a bore extending partly through the ball.

FIG. 7 illustrates one embodiment of a ball 26 that can be incorporated into the ball joint 22 of the flex grip fixture clamp 10. The ball 26 can have any desired size, but preferably has a radius of about 0.625 inches (1.588 cm). The ball 26 also preferably has a bore 122. In one embodiment, the bore 122 is 0.375 inches (0.953 cm) in diameter and has any suitable thread design. In one embodiment, the bore 122 advantageously has sixteen threads per inch. The bore 122 is thus configured to receive and to engage a bolt that is inserted through the through-bore 94 in each of the sides of the biscuit clamp 18 and through the through-bore 118 in the link member 30 of the ball joint 22. Thus, the biscuit clamp can be joined to the ball joint 22 and to the progressive support clamp 14. As discussed above, such a bolt can be coupled with the handle 100, which can facilitate tightening and loosening the biscuit clamp 18 so that accessories can be secured thereto more easily.

The flex grip fixture clamp 10 is positional in all three spatial dimensions through the rotation of the ball joint to provide omnidirectional positioning of an accessory attached to the biscuit clamp 18. In one embodiment, such positioning achieves at least a 180-degree range of motion in all directions. By providing such a wide range of positioning for lighting accessories, the flex grip fixture clamp 10 enables the user to create a greater range of lighting effects. The flex grip fixture clamp is particularly advantageous because it provides the above-described omnidirectional positioning without requiring separate fixture clamps for horizontal and vertical positioning. This reduces equipment expenditures and maintenance costs. In addition, because half of the clamps previously needed can be eliminated, support personnel can be reassigned, thereby reducing labor costs. Also, the flex grip fixture clamp 10 greatly simplifies the positioning of the biscuit clamp 18 and an attached accessory because the positioning can be achieved by manipulating a single handle 36 rather than requiring manipulation of a multiplicity of knobs.

In addition to providing omnidirectional positioning of the biscuit clamp 18 and an attached accessory, the flex grip fixture clamp 10 provides progressive clamping of a support member and the ball joint 22. As discussed above, the flex grip fixture clamp 10 has a handle 36 that actuates and de-actuates the progressive support clamp 10. In one embodiment, the handle 36 can be used to initially actuate the progressive support clamp 10 from an open position to a support member clamp position. In the support member clamp position, the flex grip fixture clamp 10 is secured to a support member in a support member channel (e.g., the support member channel defined between the first recess 46a in the front housing 32 and the first recess 46b in the back plate 34). In the support member clamp position, the ball 26 has sufficient freedom of movement to permit positioning of the ball 26 with respect to the support member so that the biscuit clamp.18 and the attached accessory can be fully positioned. In the illustrated embodiment, the progressive clamping is due to arrangement of the front housing 32, the back plate 34, and the ball joint 22 and the manner in which these components interrelate.

The handle 36 can be further actuated from the support member clamp position to a full clamp position. In the full clamp position, the flex grip fixture clamp 10 remains secured to the support member, as discussed above. In addition, the ball 26 is securely clamped to fix the position of the biscuit clamp 18 and the attached accessory with respect to the support member.

From the full clamp position, the handle 36 can be partially de-actuated to the support member clamp position, discussed above to release the ball 26 while the support member remains clamped in a support member channel. In this position, the accessory held by the biscuit clamp 18 can again be oriented by movement of the ball 26 without releasing the support member.

The handle 36 can then be actuated again to the full clamp position or it can be fully de-actuated to also release the support member. Thus, the flex grip fixture clamp 10 is actuated by the handle 36 to progressively clamp the support member and the ball 26. Similarly, the flex grip fixture clamp 10 is de-actuated by the handle 36 to progressively unclamp the ball 26 and the support member.

The flex grip fixture clamp 10 advantageously also provides for fine adjustment. In particular, in one embodiment, the slot 43 and the through-bore 44 in the front housing 32 and the tab 71 in the back plate 34 are configured for fine adjustment of ball joint 22 of the clamp 10. As discussed above, the tab 71 of the back plate 34 is configured to extend into the slot 43 of the front housing 32 when the flex grip fixture clamp 10 is assembled. The through-bore 44 preferably is threaded to engage an advanceable member, such as a hex screw. The advanceable member, when advanced, engages a surface of the tab 71 that faces the end of the advanceable member that extends into the slot 43. By advancing the advanceable member, the tab 71 is moved closer to the ball 26. Accordingly, the ball 26 is engaged sooner when the handle 36 actuates the clamp 10. This enables the clamp 10 to function in a variety of applications, including with accessories of various weights and with support members of various size and shapes. Of course, the flex grip fixture clamp 10 can be made without the fine adjustment feature within the scope of the invention.

As discussed above, the flex grip fixture clamp 10 advantageously has a relatively simple construction. For example, in one embodiment, the link member 30 is integrally made with the ball 26 and is attached to a portion of the biscuit clamp 18. In another embodiment, the link member 30 and a portion of the biscuit clamp 18 are integrally made, and the link member 30 is attached to the ball 26. In another embodiment, the ball 26 is attached to the link member 30, and the link member 30 is attached to the biscuit clamp 18. The ball 26, the link member 30, and a portion of the biscuit clamp 18 can all be integrally formed. One skilled in the art will appreciate that other portions of the flex grip fixture clamp can also be integrally made, e.g., the ring 31 and the front housing 32. More details of the construction of the flex grip fixture clamp are set forth in U.S. Provisional Application Ser. No. 60/419,379, filed Oct. 17, 2002.

Although the present invention has been described in terms of certain preferred embodiments, other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. A flex grip fixture clamp, comprising:
   a progressive support clamp comprising:
      a support member channel configured to receive a support member;
      a semispherical recess; and
      a handle;
   a biscuit clamp comprising an accessory member channel configured to receive a component of an accessory; and
   a ball joint comprising a ball selectably engageable with the semispherical recess, the ball joint interconnecting the progressive support clamp and the biscuit clamp,
   wherein the progressive support clamp is actuatable via the handle from an open position to a support member clamp position, the support member clamp position precluding movement of the fixture clamp with respect to the support member and allowing rotation of the ball, and wherein the progressive support clamp is further actuatable via the handle to a full clamp position, the full clamp position fixing the position of the ball.

2. The flex grip fixture clamp of claim 1, wherein the ball joint is configured to provide omnidirectional positioning of the biscuit clamp.

3. The flex grip fixture clamp of claim 2, wherein the ball joint has at least 180 degrees of motion in all directions.

4. The flex grip fixture clamp of claim 1, wherein the ball joint has at least 180 degrees of motion in all directions.

5. The flex grip fixture clamp of claim 1, wherein the ball joint further comprises a link member located between the ball and the biscuit clamp so that movement of the ball is transmitted through the link member to the biscuit clamp.

6. A flex grip fixture clamp, comprising:
   a progressive support clamp comprising:
      a support member channel configured to receive a support member;
      a semispherical recess; and
      a handle;
   a biscuit clamp comprising an accessory member channel configured to receive a component of an accessory; and
   a ball joint comprising a ball selectably engageable with the semispherical recess and a link member located between the ball and the biscuit clamp so that movement of the ball is transmitted through the link member to the biscuit clamp, the ball joint interconnecting the progressive support clamp and the biscuit clamp;
   wherein the progressive support clamp is actuatable via the handle from an open position to a support member clamp position, the support member clamp position precluding movement of the fixture clamp with respect to the support member and allowing rotation of the ball, and wherein the progressive support clamp is further actuatable to a full clamp position, the full clamp position fixing the position of the ball; and
   wherein the link member includes a first end that is coupled with the ball and a second end that is coupled with the biscuit clamp, the first end being smaller than the second end.

7. A flex grip fixture clamp, comprising:
   a progressive support clamp comprising:
      a plurality of support member channels configured to receive a support member, the support member channels enabling the flex grip fixture clamp to be mounted on the support member in a plurality of orientations;
      a semispherical recess;
      a handle; and
   a biscuit clamp comprising an accessory member channel configured to receive a component of an accessory; and
   a ball joint comprising a ball selectably engageable with the semispherical recess, the ball joint interconnecting the progressive support clamp and the biscuit clamp,
   wherein the progressive support clamp is actuatable via the handle from an open position to a support member clamp position, the support member clamp position precluding movement of the fixture clamp with respect to the support member and allowing rotation of the ball, and wherein the progressive support clamp is further actuatable to a full clamp position, the full clamp position fixing the position of the ball.

8. The flex grip fixture clamp of claim 1, wherein the ball joint comprises a ring bearing having a curved wall of a radius matching that of the ball, the ring bearing being located on a hemisphere of the ball opposite to the location of the semispherical recess.

9. A flex grip fixture clamp, comprising:
   a progressive support clamp comprising:
      a support member channel configured to receive a support member;
      a semispherical recess; and
      a handle;
   a biscuit clamp comprising an accessory member channel configured to receive a component of an accessory; and
   a ball joint comprising a ball selectably engageable with the semispherical recess, the ball joint interconnecting the progressive support clamp and the biscuit clamp,
   wherein the progressive support clamp is actuatable via the handle from an open position to a support member clamp position, the support member clamp position precluding movement of the fixture clamp with respect to the support member and allowing rotation of the ball, and wherein the progressive support clamp is further actuatable to a full clamp position, the full clamp position fixing the position of the ball; and wherein the biscuit clamp further comprises a plurality of accessory member channels.

10. The flex grip fixture clamp of claim 9, wherein at least two of the accessory member channels have different transverse cross-sectional sizes.

11. A method for positioning an accessory, the method comprising:
providing a flex grip fixture clamp comprising a progressive support clamp, a handle, an accessory clamp, and a ball joint that interconnects the progressive support clamp and the accessory clamp, the ball joint comprising a ball that is at least partially received by the progressive support clamp and a link member that extends to and is coupled with the accessory clamp;
coupling an accessory with the accessory clamp;
actuating the flex grip fixture clamp to an open position to enable the progressive support clamp to be coupled with a support member;
actuating the handle to actuate the flex grip fixture clamp to a support member clamp position, to clamp the support member without clamping the ball joint; and
actuating the handle to actuate the flex grip fixture clamp to a full clamp position, wherein the support member clamps the ball joint so that the position of the ball is fixed.

12. The method of claim 11, further comprising providing a biscuit clamp as the accessory clamp.

13. The method of claim 12, wherein coupling the accessory with the biscuit clamp further comprises inserting a member connected to the accessory into a channel formed in the biscuit clamp.

14. The method of claim 11, wherein the flex grip fixture clamp further comprises a support member channel, the method further comprising inserting a support member into the support member channel prior to actuating the flex grip fixture clamp from the open position to the support member clamp position.

15. The method of claim 11, further comprising articulating the ball joint to position the accessory clamp.

16. The method of claim 15, wherein articulating the ball joint comprises positioning the ball within the progressive support clamp.

17. A grip head, comprising:
a progressive support clamp having an elongate mounting arm, a ball joint portion, and a clamp actuating handle, the elongate mounting arm defining a first support member channel that extends along a central longitudinal axis of the elongate mounting arm, the ball joint portion defining a semispherical recess and a bearing recess positioned opposite the semispherical recess;
a biscuit clamp having a plurality of support member channels configured to receive support rods of different sizes from a photographic accessory; and
a ball joint comprising the semispherical recess, a ball contacting the semispherical recess, a bearing that is received by the bearing recess, and a link member extending between the ball and the biscuit clamp,
wherein the progressive support clamp is actuatable from an open position to a support member clamp position, the support member clamp position clamping a support member in the support member channel without clamping the ball, and wherein the progressive support clamp is further actuatable to a full clamp position, the full clamp position clamping the support member in the support member channel and also clamping the ball to fix the position of the ball.

18. A grip head, comprising:
a progressive support clamp having an elongate mounting arm, a ball joint portion, and a clamp actuating handle, the elongate mounting arm defining a first support member channel that extends along a central longitudinal axis of the elongate mounting arm and a second support member channel aligned generally perpendicular to the first support member channel, the ball joint portion defining a semispherical recess and a bearing recess positioned opposite the semispherical recess;
a biscuit clamp having a plurality of support member channels configured to receive support rods of different sizes from a photographic accessory; and
a ball joint comprising the semispherical recess, a ball contacting the semispherical recess, a bearing that is received by the bearing recess, and a link member extending between the ball and the biscuit clamp,
wherein the progressive support clamp is actuatable from an open position to a support member clamp position, the support member clamp position clamping a support member in the support member channel without clamping the ball, and wherever the progressive support clamp is further actuatable to a full clamp position, the full clamp position clamping the support member in the support member channel and also clamping the ball to fix the position of the ball.

19. A grip head, comprising:
a progressive support clamp having an elongate mounting arm, a ball joint portion, and a clamp actuating handle, the elongate mounting arm defining a first support member channel that extends alone a central longitudinal axis of the elongate mounting arm, the ball joint portion defining a semispherical recess and a bearing recess positioned opposite the semispherical recess;
a biscuit clamp having a plurality of support member channels configured to receive support rods of different sizes from a photographic accessory; and
a ball joint comprising the semispherical recess, a ball contacting the semispherical recess, a bearing that is received by the bearing recess, and a link member extending between the ball and the biscuit clamp,
wherein the progressive support clamp is actuatable from an open position to a support member clamp position, the support member clamp position clamping a support member in the support member channel without clamping the ball, and wherein the progressive support clamp is further actuatable to a full clamp position, the full clamp position clamping the support member in the support member channel and also clamping the ball to fix the position of the ball; and
wherein the progressive support clamp comprises a front housing having a front housing connecting bore, a back plate having a back plate connecting bore aligned with the front housing connecting bore, and a fastener configured to extend through at least one of the front housing connecting bore and the back plate connecting bore to couple the front housing and the back plate together.

20. A flex grip fixture clamp, comprising:
a progressive clamp comprising:
a support member channel configured to receive a support member;

a semispherical recess; and a handle having at least an open position, a support member clamp position and a full clamp position;

a biscuit clamp comprising an accessory member channel configured to receive a component of an accessory; and a ball joint comprising a ball selectably engageable with the semispherical recess, the ball joint interconnecting the progressive clamp and the biscuit clamp, the progressive clamp responsive to the handle being in the open position to enable movement of the progressive clamp with respect to the support member and to enable movement of the ball with respect to the progressive clamp, the progressive clamp responsive to the handle being in the support member clamp position to inhibit movement of the progressive clamp with respect to the support member and to enable movement of the ball with respect to the progressive clamp, and the progressive clamp responsive to the handle being in the full clamp position to inhibit movement of the progressive clamp with respect to the support member and to inhibit movement of the ball with respect to the progressive clamp.

21. A flex grip fixture clamp, comprising:

a progressive support clamp comprising:

a support member channel configured to receive a support member;

a semispherical recess; and a handle having at least an open position, a support member clamp position, and a full clamp position;

a biscuit clamp comprising an accessory member channel configured to receive a component of an accessory; and a ball joint comprising a ball selectably engageable with the semispherical recess, the ball joint interconnecting the progressive support clamp and the biscuit clamp, wherein the progressive support clamp is actuatable from the open position to the support member clamp position, the support member clamp position precluding movement of the fixture clamp with respect to the support member and allowing rotation of the ball, and wherein the progressive support clamp is further actuatable to the full clamp position, the full clamp position fixing the position of the ball.

* * * * *